United States Patent [19]

Umeda

[11] Patent Number: 5,235,694
[45] Date of Patent: Aug. 10, 1993

[54] MULTI I/O DEVICE SYSTEM USING TEMPORARY STORE OF RAM DATA WHEN ASSOCIATED COMMUNICATING I/O DEVICES ARE OPERATING AT VARIOUS CLOCKING PHASES

[75] Inventor: Akira Umeda, Chigasaki, Japan

[73] Assignee: Kabushiki Kaisha Toshiba, Kawasaki, Japan

[21] Appl. No.: 605,356

[22] Filed: Oct. 30, 1990

[30] Foreign Application Priority Data

Oct. 31, 1989 [JP] Japan ................................ 1-283744

[51] Int. Cl.⁵ ............................................. G06F 12/00
[52] U.S. Cl. ............................... 395/425; 395/275;
395/375; 395/550; 364/DIG. 1; 364/238.4;
364/242.3; 364/242.31; 364/249.4
[58] Field of Search .............................. 395/400, 425;
364/200 MS File, 900 MS File

[56] References Cited
U.S. PATENT DOCUMENTS

| | | | |
|---|---|---|---|
| 4,545,014 | 10/1985 | Oguchi | 395/425 |
| 4,792,929 | 12/1988 | Olson et al. | 365/233 |
| 4,912,632 | 2/1990 | Gach et al. | 395/425 |

Primary Examiner—Joseph L. Dixon
Assistant Examiner—Frank J. Asta
Attorney, Agent, or Firm—Finnegan, Henderson, Farabow, Garrett & Dunner

[57] ABSTRACT

When a data read timing of a DMAC is not matched with an output timing of data read out from a DRAM, the readout data is held in a register until a subsequent data read timing of the DMAC comes to the front. When data is read out from the DRAM, and if a processor clock of the DMAC has a phase matched with that of an operation clock of the DRAM, then a direct read operation is performed. If the phases of the two clocks are not matched with each other, the readout data from the DRAM is temporarily stored in the register and then fetched in the DMAC.

14 Claims, 6 Drawing Sheets

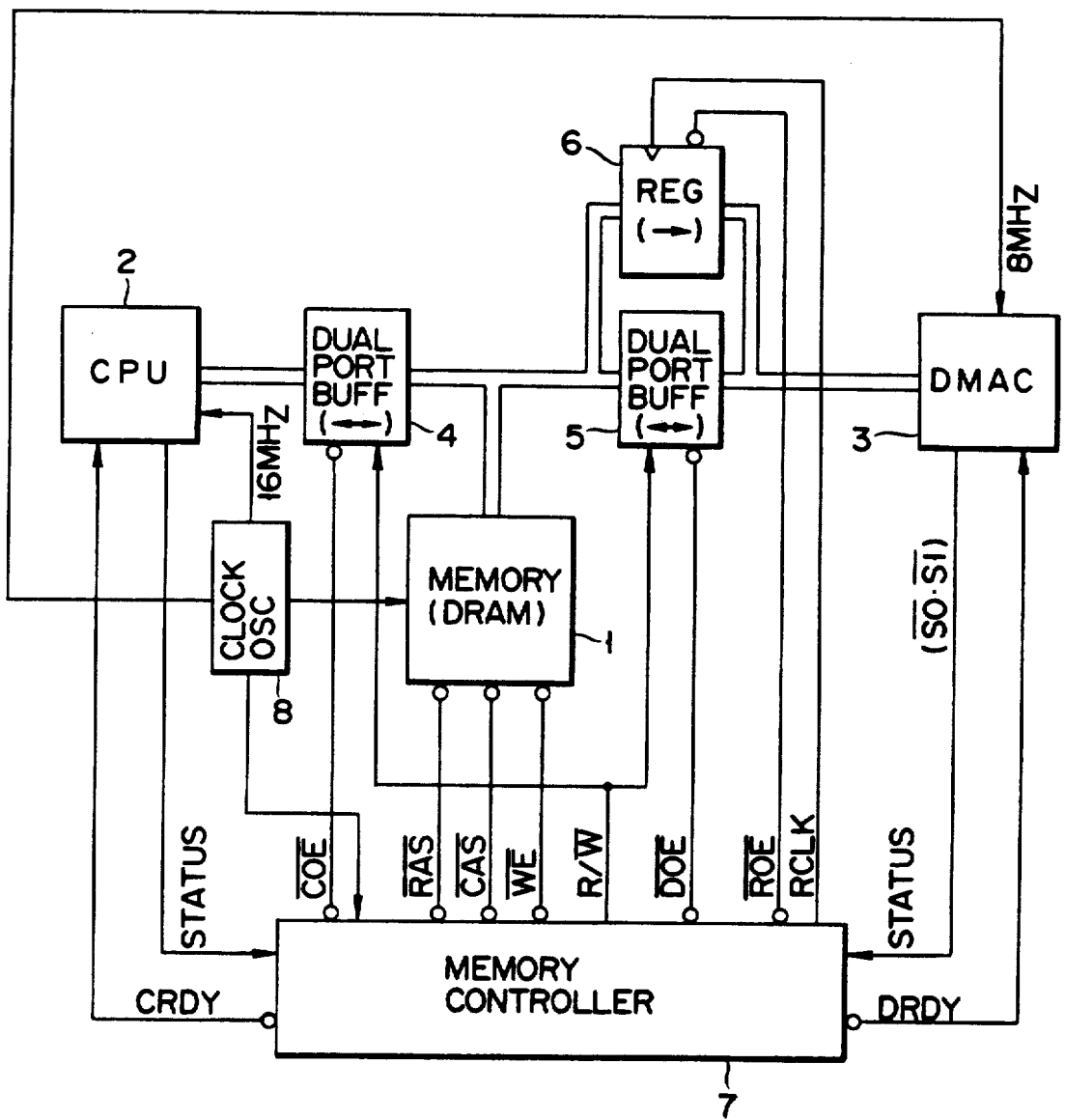
F I G. 1

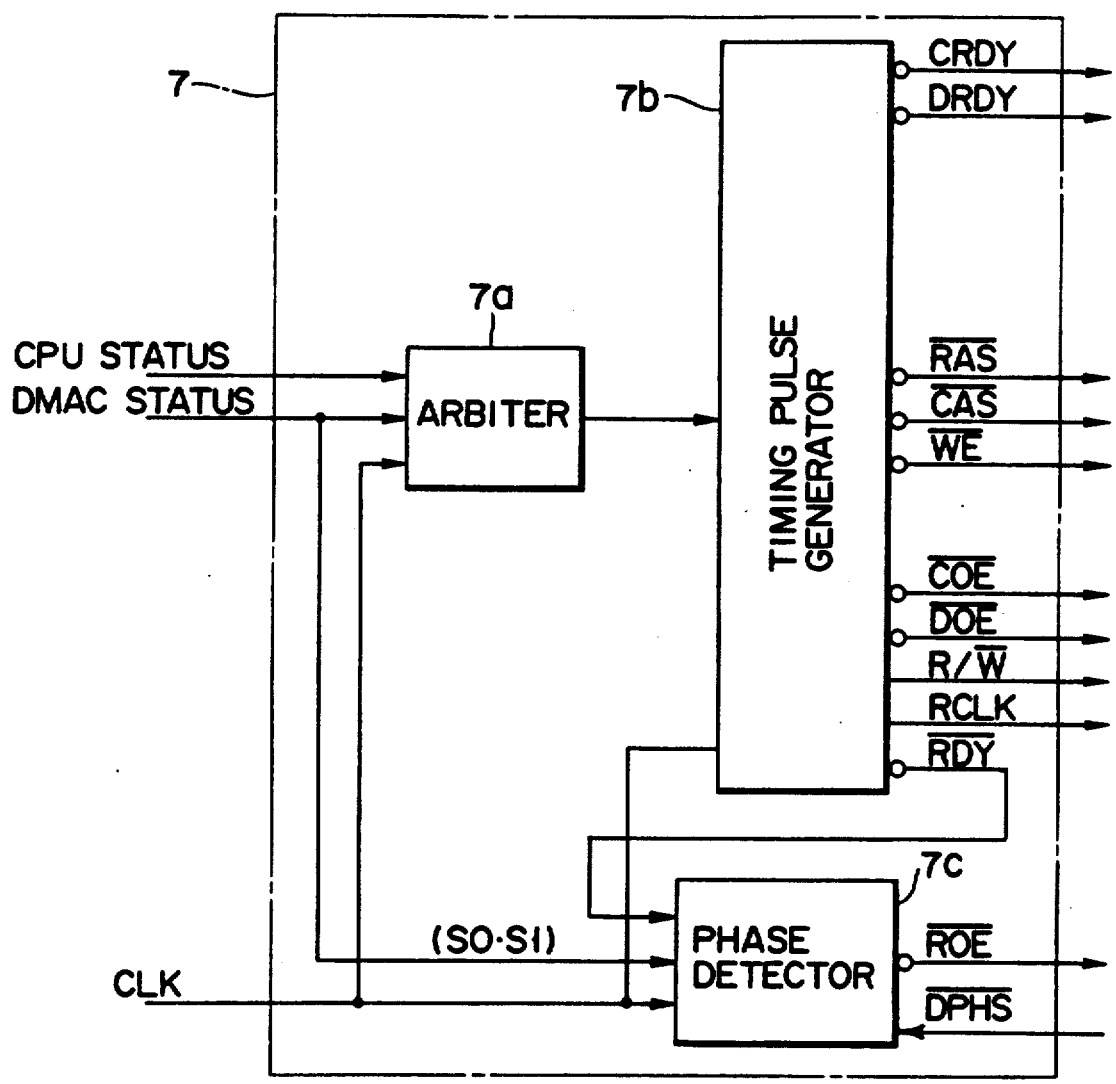
F I G. 2

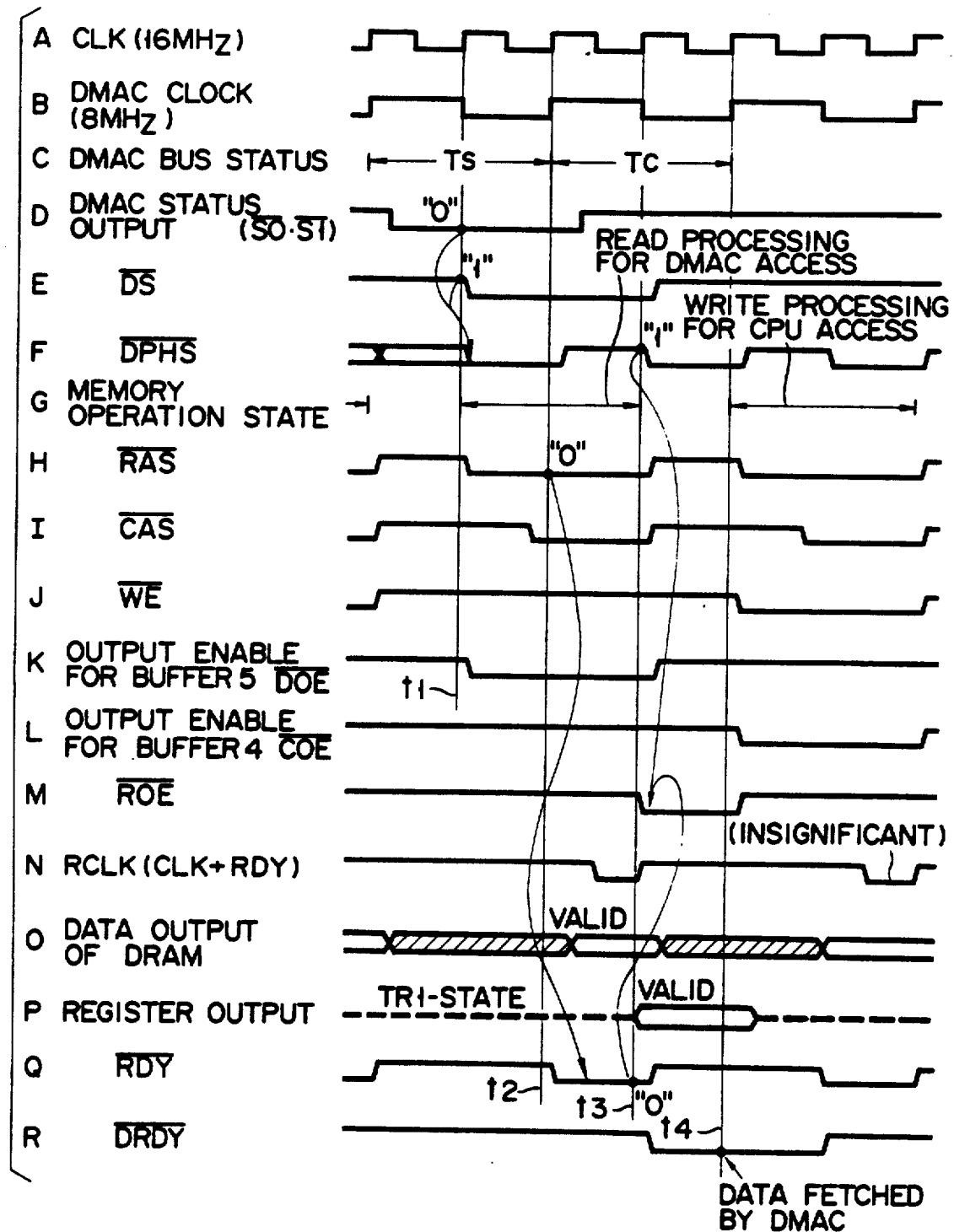
F I G. 3

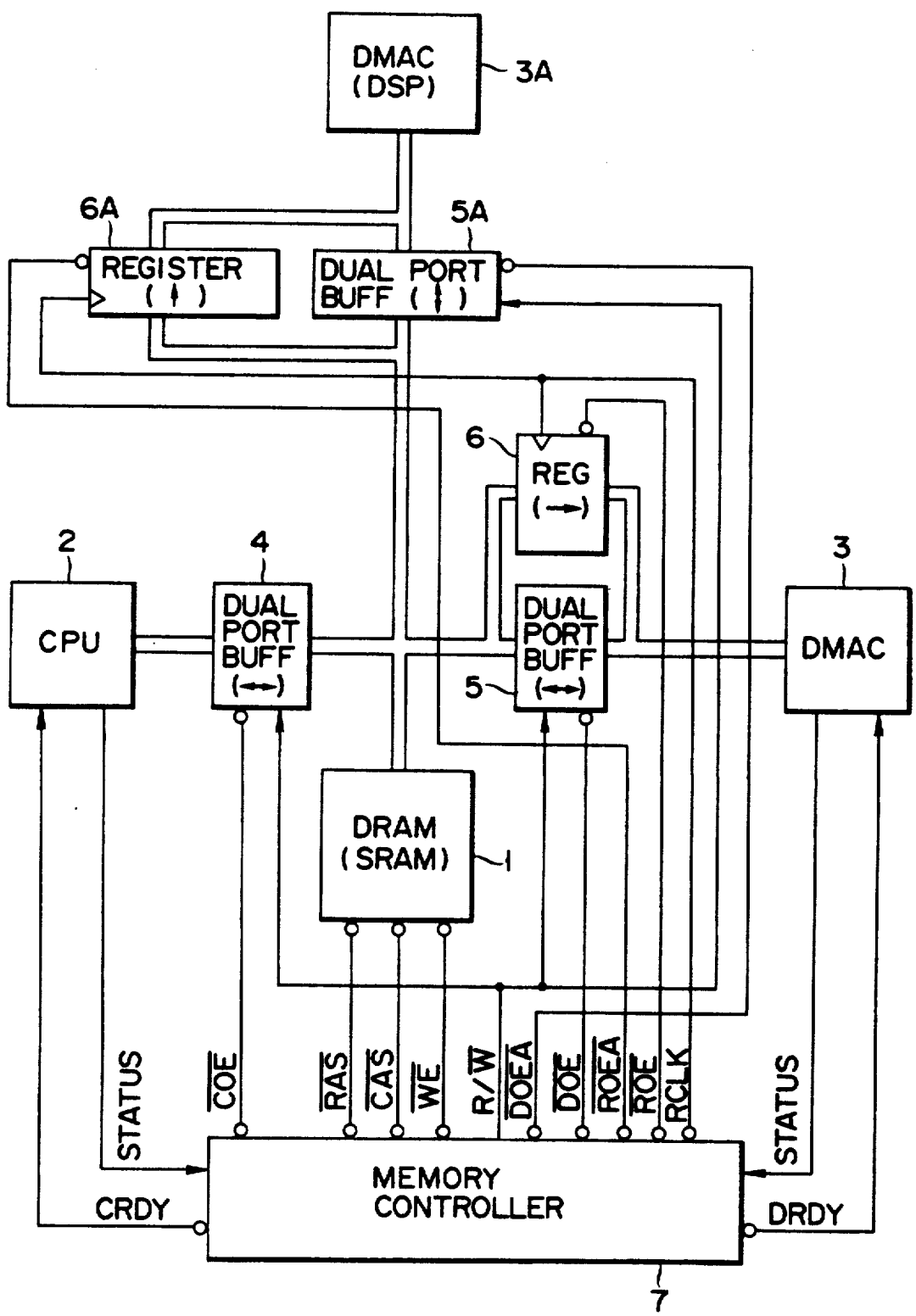
F I G. 5

MULTI I/O DEVICE SYSTEM USING TEMPORARY STORE OF RAM DATA WHEN ASSOCIATED COMMUNICATING I/O DEVICES ARE OPERATING AT VARIOUS CLOCKING PHASES

BACKGROUND OF THE INVENTION

1. Field of the Invention

The present invention relates to control of a memory apparatus including a CPU (Central Processing Unit), a DMAC (Direct Memory Access Controller), and a DRAM (Dynamic Random Access Memory), and to an optical filing system using this memory control.

2. Description of the Related Art

When a processor clock period of a CPU or a DMAC and an operation clock of a DRAM are the same but their phases do not match each other, one of the processor clock and operation clock is removed by one clock to perform phase matching so that a transit point of the processor clock matches that of the DRAM operation clock. Therefore, a circuit design of a memory apparatus can be made easy by designing an output timing of data read out from a DRAM to be matched with a transit point of an operation clock of the DRAM.

As development of CPU techniques has progressed and speed of a CPU processor clock has been increased, however, speed of a DRAM operation clock must be increased (or an access time of a DRAM must be shortened) accordingly. When a DMAC is operated with a low-speed processor clock, even if the output timing of readout data from the DRAM is matched with the transit point of the DRAM operation clock, this output timing does not always coincide with the transit point of the CPU processor clock. As a result, a throughput in data processing of an optical filing system, including the memory apparatus, becomes low.

SUMMARY OF THE INVENTION

It is accordingly an object of the present invention to provide memory control in which even if the data read timing of a CPU or a DMAC does not match the output timing of readout data from a memory, the memory can transit to the next memory access cycle without waiting for a subsequent data read timing of the CPU or the DMAC.

Another object of the present invention is to provide an optical data filing system employing the above memory control.

In order to achieve the above object, a memory control system of the present invention comprises a memory means for storing data and operating by a predetermined operation clock, a first read means for operating by a processor clock having a period which is an even multiple of a period of the operation clock of the memory means, a second read means for operating by a processor clock having a period which is an even multiple of the period of the operation clock of the memory means, a register means for temporarily storing data read out from the memory means when an output timing of the data read out from the memory means falls in the middle of the processor clock of the first or second read means, means for detecting a transit point of the processor clock of the first or second read means, and a control means for outputting the data stored in the register means to the first or second read means in synchronism with the transit point of the processor clock detected by the detecting means.

According to the present invention having the above arrangement, if a data read timing of the first or second read means does not match an output timing of readout data from the memory means, the readout data is retained in the register means until a subsequent data read timing of the first or second read means comes to the front. Thus, the control means can immediately transit to the next memory access cycle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing an arrangement of a memory apparatus according to an embodiment of the present invention;

FIG. 2 is a block diagram showing an arrangement of a memory controller;

FIGS. 3A to 3R are timing charts showing an operation performed when a clock phase of a DRAM is not matched with a clock phase of a DMAC;

FIG. 5 is a block diagram showing an arrangement of a memory apparatus according to another embodiment of the present invention.

DETAILED DESCRIPTION OF THE PREFERRED EMBODIMENTS

Figure 4:
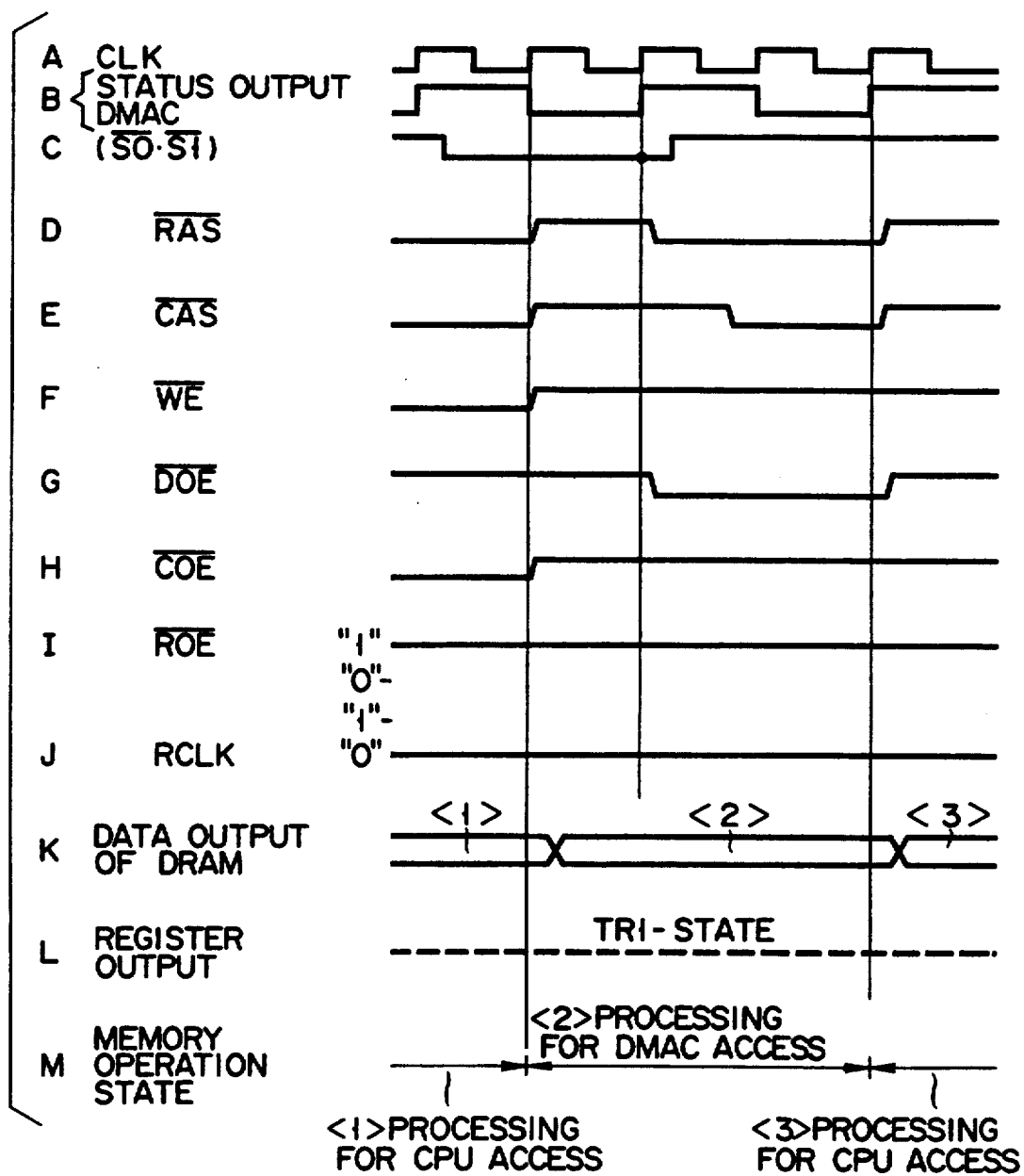
FIG. 4 is a timing chart showing an operation performed when an operation timing of the DRAM matches a bus timing of the DMAC.

Preferred embodiments of the present invention will be described in detail below with reference to the accompanying drawings.

FIG. 1 shows an arrangement of a memory apparatus according to the present invention. This memory apparatus can be used in an optical data filing system in which data recording and data reproducing on and from a recording medium (such as MO disks and hard disk drives) are performed according to given program instruction data.

Referring to FIG. 1, reference numeral 1 denotes a DRAM (Dynamic Random Access Memory); 2, a CPU (Central Processing Unit); 3, a DMAC (Direct Memory Access Controller); 4, a dual port buffer arranged between DRAM 1 and CPU 2; 5, a dual port buffer arranged between DRAM 1 and DMAC 3; 6, a read register arranged between DRAM 1 and DMAC 3 in parallel with buffer 5; 7, a memory controller for controlling the above parts; and 8, a clock oscillator for generating various types of clocks.

A processor clock (e.g., 16 MHz) of CPU 2 has a period which is 2 n (n=4) times that of an operation clock (e.g., 4 MHz) of DRAM 1. These clocks are obtained by frequency-dividing an oscillator output having an original oscillation frequency of 32 MHz by oscillator 8.

A processor clock (e.g., 8 MHz) of DMAC 3 has a period which is 2 m (m=2) times that of the operation clock (e.g., 4 MHz) of DRAM 1. These clocks are obtained by frequency-dividing the oscillator output having an original oscillation frequency of 32 MHz by oscillator 8.

Note that a combination of the CPU and the DMAC is not limited to the above combination. For example, two CPUs which operate by different processor clocks (having a period which is 2 n times that of an operation clock of a DRAM) may be used in combination with each other. In addition, DRAM 1 may be used in combination with or replaced by an SRAM or a ROM.

FIG. 2 shows an internal arrangement of memory controller 7.

Memory controller 7 comprises arbiter 7a, timing pulse generator 7b, and phase detector 7c.

Arbiter 7a receives a status from CPU 2 or DMAC 3 and supplies a start signal to timing pulse generator 7b. During an operation, arbiter 7a holds the request.

Timing pulse generator 7b receives the start signal from arbiter 7a and generates various types of signals corresponding to the status.

Examples of the signal generated by timing pulse generator 7b are a ready signal (CRDY) for CPU 2, a ready signal (DRDY) for DMAC 3, an output enable signal ($\overline{COE}$) for buffer 4, an output enable signal ($\overline{DOE}$) for buffer 5, a read clock pulse signal ($\overline{RCLK}$) for register 6, a row address strobe signal ($\overline{RAS}$), a column address strobe signal ($\overline{CAS}$), and a write enable signal ($\overline{WE}$) for DRAM 1, and a read/write switch signal (R/$\overline{W}$) for buffers 4 and 5. Timing pulse generator 7b also generates a ready signal ($\overline{RDY}$) for phase detector 7c.

Phase detector 7c receives the status and a phase signal ($\overline{DPHS}$) from DMAC 3 and RDY from timing pulse generator 7b and generates an output enable signal ($\overline{ROE}$) for register 6 in accordance with CLK.

An operation of the above arrangement will be described below.

A memory read operation (WE="1" in FIG. 3J) performed by DMAC 3 when a phase of a processor clock of DMAC 3 is not matched with a phase of an operation clock of DRAM 1 will be described with reference to FIGS. 3A to 3R.

When the phases of the DRAM and the DMAC are not matched, phase detector 7c detects a timing at which signal $\overline{S_0 \cdot S_1}$ (FIG. 3D) as a status output from DMAC 3 changes to LOW, thereby determining the phase of the processor clock of DMAC 3.

In this case, signal $\overline{DS}$ (FIG. 3E) indicating a state of signal $\overline{S_0 \cdot S_1}$ obtained one clock after signal CLK (FIG. 3A) is made from above signal $\overline{S_0 \cdot S_1}$, and signal DPHS (FIG. 3F) indicating the phase of the processor clock of DMAC 3 is forcibly changed to LOW level (time t1) under the conditions of "$\overline{S_0 \cdot S_1}$=LOW (0)" and "$\overline{DS}$=HIGH (1)". Except for the above conditions, signal $\overline{DPHS}$ takes a logic value opposite to that of previous $\overline{DPHS}$.

As a result, after the first leading edge (time t1) of signal CLK as "$\overline{S_0 \cdot S_1}$=LOW", signal $\overline{DPHS}$ is changed like "0, 1, 0, 1, . . ." at each leading edge of signal CLK (FIG. 3A), and this value directly indicates the phase of the processor clock of DMAC 3 at each leading edge of signal CLK. That is, the phases of signal $\overline{DPHS}$ and the processor clock of DMAC 3 are matched with each other.

In this case, assume that the phase of the processor clock of DMAC 3 can be determined from only signal $\overline{S_0 \cdot S_1}$ (FIG. 3D).

In a certain type of a DMAC in which a clock (16 MHz) having a frequency twice that of the processor clock (8 MHz) of DMAC 3 shown in FIG. 1 must be input to a chip, this clock (16 MHz) is internally frequency-divided but is not externally output. Therefore, signal DPHS is made from signal $\overline{S_0 \cdot S_1}$ without referring to the processor clock of DMAC 3.

In general, since a LOW-level duration (FIG. 3D) of signal $\overline{S_0 \cdot S_1}$ is not delayed beyond a period (125 μs at 8 MHz) of signal CLK (FIG. 3B) of the DMAC, the phase of phase signal $\overline{DPHS}$ can be used in determination.

In this manner, the phase of the processor clock of DMAC 3 can be determined from signal $\overline{DPHS}$. That is, when "DPHS=LOW", the leading edge of signal CLK corresponds to a transit point between cycles of the processor clock of the DMAC, i.e., a transit point of a bus status (Ts : status state or Tc : command execute status in FIG. 3C). When "$\overline{DPHS}$=HIGH", the leading edge of signal CLK is in the middle of the cycle (bus active status).

In the state shown in FIGS. 3A to 3R, if a memory read access from DMAC 3 starts (if an access from DMAC 3 unconditionally starts without an access request from CPU 2) at the leading edge of above signal CLK, signal $\overline{RAS}$ (FIG. 3H) rises. Subsequently, signal $\overline{CAS}$ (FIG. 3I) falls, and signal $\overline{RDY}$ (FIG. 3Q) goes low at the leading edge (time t2) of signal CLK under the condition of "$\overline{RAS}$=LOW".

This signal $\overline{RDY}$ indicates the end of an operation of DRAM 1. The leading edge (time t3) of signal CLK obtained under the condition of "$\overline{RDY}$=LOW" indicates the end of a memory access.

When the memory access is ended, read data (a data output from DRAM 1) is valid (FIG. 3O). If, however, the condition of "$\overline{DPHS}$=HIGH" is satisfied (times t2 to t3), a bus status of DMAC 3 is in the middle of the cycle. Therefore, DMAC 3 cannot fetch the read data. That is, since DMAC 3 cannot end an instruction execution cycle except at a transit point of the bus status, it cannot fetch the data. In this case, no problem arises if signal $\overline{DPHS}$ is at LOW (time t3).

For this reason, register 6 is used to hold data until a timing at which DMAC 3 fetches the data. In this case, the read data (FIG. 3O) is fetched in register 6 whenever a memory access is ended, and the output from register 6 is enabled when signal $\overline{RDY}$ goes low (after time t2) under the condition of "$\overline{DPHS}$=HIGH" (after time t2), thereby causing register 6 to output the data (FIG. 3P). For this purpose, signal RCLK (FIG. 3N) for fetching the read data in register 6 and signal $\overline{ROE}$ (FIG. 3M) for enabling the output from register 6 are prepared. This signal RCLK is obtained by a logical OR of signals CLK and $\overline{RDY}$. The data is fetched by register 6 at the leading edge (time t3) of signal RCLK.

Since signal $\overline{RDY}$ (FIG. 3Q) is activated even when DMAC 3 does not access, signal RCLK (INSIGNIFICANT indicated in FIG. 3N) is output regardless of the operation state. Since, however, DMAC 3 always fetches data in a cycle (times t3 to t4) of signal CLK after signal RCLK is output, no problem is posed.

In addition, signal $\overline{ROE}$ (FIG. 3M) is activated for one period of signal CLK (FIG. 3A) at the leading edge of signal CLK when signal $\overline{RDY}$ goes low under the condition of "$\overline{DPHS}$=HIGH", and the data held in register 6 is output to DMAC 3 (time t4).

The memory read operation from DMAC 3 is ended as described above when the transit point of the operation state of DRAM 1 is not matched with the transit point of the bus status of DMAC 3.

Signal $\overline{DRDY}$ (FIG. 3R) is output to command DMAC 3 to end an instruction execution cycle which is currently being executed. Signal $\overline{DRDY}$ is generated for two periods of signal CLK (FIG. 3A) under the conditions of "$\overline{RAS}$=LOW", "$\overline{RDY}$=HIGH", and "$\overline{DPHS}$=HIGH" or the conditions of "$\overline{RAS}$=LOW", "$\overline{RDY}$=LOW", and "$\overline{DPHS}$=HIGH".

FIG. 4 shows a memory read operation performed by DMAC 3 when the transit point of the operation state of DRAM 1 is matched with the transit point of the bus status of DMAC 3.

FIG. 4 illustrates that readout data is fetched in DMAC 3 at the end timing of memory access processing. That is, when the phase of the processor clock of DMAC 3 is matched with the phase of the operation clock of DRAM 1, read data is fetched directly in DMAC 3 via buffer 5 without being temporarily held in register 6.

FIG. 5 shows a modification of the memory apparatus shown in FIG. 1. An arrangement shown in FIG. 5 includes second DMAC (or a co-processor such as a digital signal processor) 3A, and dual port buffer 5A and register 6A for interfacing between DMAC 3A and DRAM 1 in addition to the arrangement shown in FIG. 1.

More specifically, the present invention is not limited to the combination of one CPU and one DMAC but can be applied to an apparatus including a plurality of CPUs and a plurality of peripheral chips (such as a DMAC and a digital signal processor).

Figure 6:
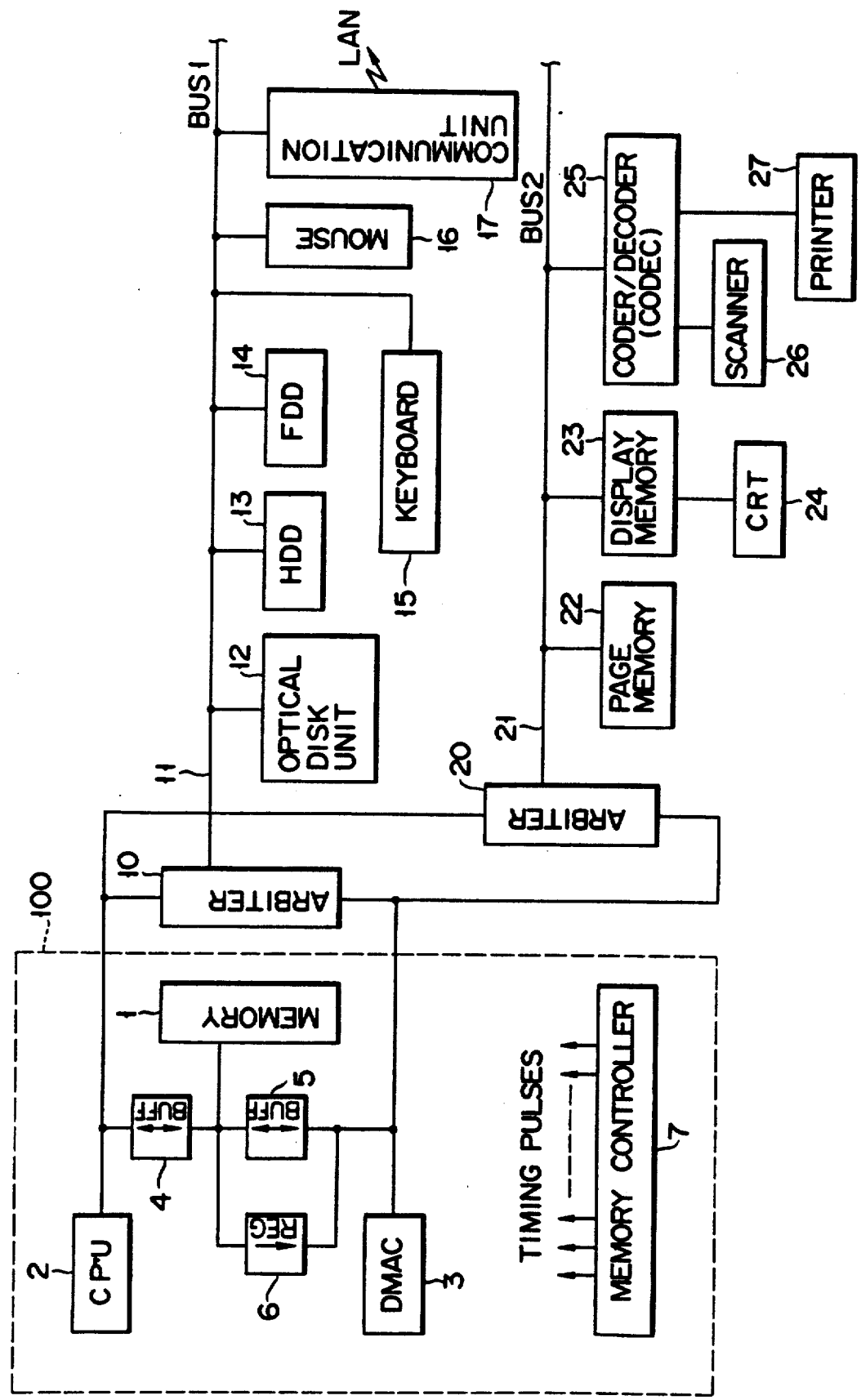
FIG. 6 is a block diagram showing an arrangement of an optical filing system incorporating the memory apparatus of the present invention.

FIG. 6 shows an arrangement in which memory apparatus 100 shown in FIG. 1 is incorporated in an optical filing system. Referring to FIG. 6, CPU 2 and DMAC 3 coupled to memory 1 via buffer 4 and buffer 5, respectively, are connected to first bus 11 via arbiter 10 and to second bus 21 via arbiter 20. Bus 11 is connected to optical disk unit 12, hard disk drive 13, floppy disk drive 14, keyboard 15, mouse 16, and communication unit 17. Bus 21 is connected to page memory 22, display memory 23 connected to CRT 24, and CODEC 25 connected to scanner 26 and printer 27.

In the optical filing system having the above arrangement, memory apparatus 100 having register 6 can access memory 1 at a high speed regardless of a state of clock phases of CPU 2 and CMAC 3 having different operation speeds.

As described above, when the data read timing of the DMAC is not matched with the read data output timing of the DRAM, the readout data is held in the register until the data read timing of the DMAC.

That is, when phases of the processor clock of the DMAC and the operation clock of the DRAM are matched with each other at a timing of reading out data from the DRAM, a direct read operation is performed. If, however, the two phases are not matched with each other, the readout data from the DRAM is temporarily held in the register and then fetched in the DMAC. In this manner, even when the data read timing of the DMAC is not matched with the read data output timing of the DRAM, a new memory read operation is enabled when the memory access processing from the DMAC is ended. Therefore, the next memory access cycle can be started before the data read timing of the DMAC.

Note that the present invention is not limited to the above embodiments but can be variously modified and carried out without departing from the spirit and scope of the invention.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. An optical data filing system in which data recording and data reproducing on and from a recording medium are performed according to given program instruction data, said system comprising:

memory means, operating by a predetermined clock, for storing the program instruction data;

first access means, operating by a first processor clock having a frequency which is an even multiple of a frequency of the predetermined clock, for accessing said memory means to obtain the program instruction data;

means for generating a phase signal that is synchronized with signal level changes of the first processor clock;

temporary memory means for temporarily storing data read out from said memory means when the phase signal and the first processor clock are synchronized at a HIGH level during a cycle of the predetermined clock; and means for transferring the data temporarily stored in said temporary memory means to said first access means when the signal level of the phase signal changes.

2. A system according to claim 1, further comprising:

means for supplying the data from said memory means to said first access means when a timing at which the data is read out from said memory means is substantially synchronous to the signal level changes of the first processor clock.

3. A system according to claim 1, further comprising:

second access means, operating by a second processor clock having a frequency which is an even multiple of the frequency of the predetermined clock and synchronized with the first processor clock, for accessing said memory means.

4. A system according to claim 3, further comprising:

means for supplying the data from said memory means to said first and second access means when the timing at which the data is read out from said memory means is substantially synchronous to the signal level changes of the first processor clock and the second processor clock.

5. A system according to claim 3, wherein said first access means generates a first status signal for indicating an operation state thereof, said second access means generates a second status signal indicating an operation state thereof, and said transfer means includes:

means for arbitrating the first status signal and second status signal at a timing of generation of a clock synchronized with the predetermined clock, and generating signals for operating said memory means, said first access means, and said second access means at a signal timing obtained by arbitrating.

6. A system according to claim 3, wherein
said memory means includes a read/write memory, and
said first access means includes a direct memory access controller coupled to said read/write memory.

7. A memory control apparatus, comprising:
memory means, operating by a predetermined clock, for storing data processed in said memory control apparatus;
first read means, operating by a first processor clock having a frequency which is 2 m times that of the predetermined clock, for reading out the data from said memory means, said m being an integer;
second read means, operating by a second processor clock having a frequency which is 2 n times that of the predetermined clock, for reading out the data from said memory means, said n being an integer;
means for generating a phase signal that is synchronized with signal level changes of the first processor clock;
temporary memory means for temporarily storing data read out from said memory means when a predetermined condition is satisfied; and
transfer means for transferring the data temporarily stored in said temporary memory means in response to the phase signal.

8. An apparatus according to claim 7, wherein the predetermined condition defines a timing at which the data is read out from said memory means when the phase signal and the first processor clock are synchronized at a HIGH level during a cycle of the predetermined clock.

9. An apparatus according to claim 7, further comprising:
means for directly supplying the data from said memory means to said first and second read means when the timing at which the data is read out form said memory means is substantially synchronous to the signal level changes of the first and second processor clocks.

10. An apparatus according to claim 7, wherein
said memory means includes a read/write memory, and
said first read means includes a direct memory access controller coupled to said read/write memory.

11. An apparatus according to claim 10, further comprising:
a first bus connected to an optical disk unit; and
a first arbiter for connecting said first bus to said direct memory access controller so as to avoid contention in data transfer.

12. An apparatus according to claim 11, further comprising:
a second bus connected to memory devices; and
a second arbiter for connecting said second bus to said direct memory access controller so as to avoid contention in data transfer.

13. A memory apparatus comprising:
memory means, operating by a predetermined operation clock, for storing data;
first means, operating by a processor clock having a frequency which is 2 n times that of the operation clock of said memory means, for accessing said memory means, said n being an integer;
second means, operating by a processor clock having a frequency which is 2 m times that of the operation clock of said memory means, for accessing said memory means, said m being an integer;
register means for, when said memory means is accessed and the data is read out therefrom, and if an output timing of the data read out from said memory means falls in the middle of the processor clock of said first or second means, temporarily storing the data;
means for detecting changes in the signal level of the processor clocks of said first and second means; and
means for outputting the data stored in said register means to said first or second means synchronized with the changes in the signal level of the processor clock detected by said detecting means.

14. An apparatus according to claim 13, further comprising:
means for, when an output timing of data read out from said memory means matches the changes in the signal level of the processor clocks of said first and second means during a data read operation of said memory means, outputting the data to said first and second means without passing through said register means.

* * * * *